Figure 1:
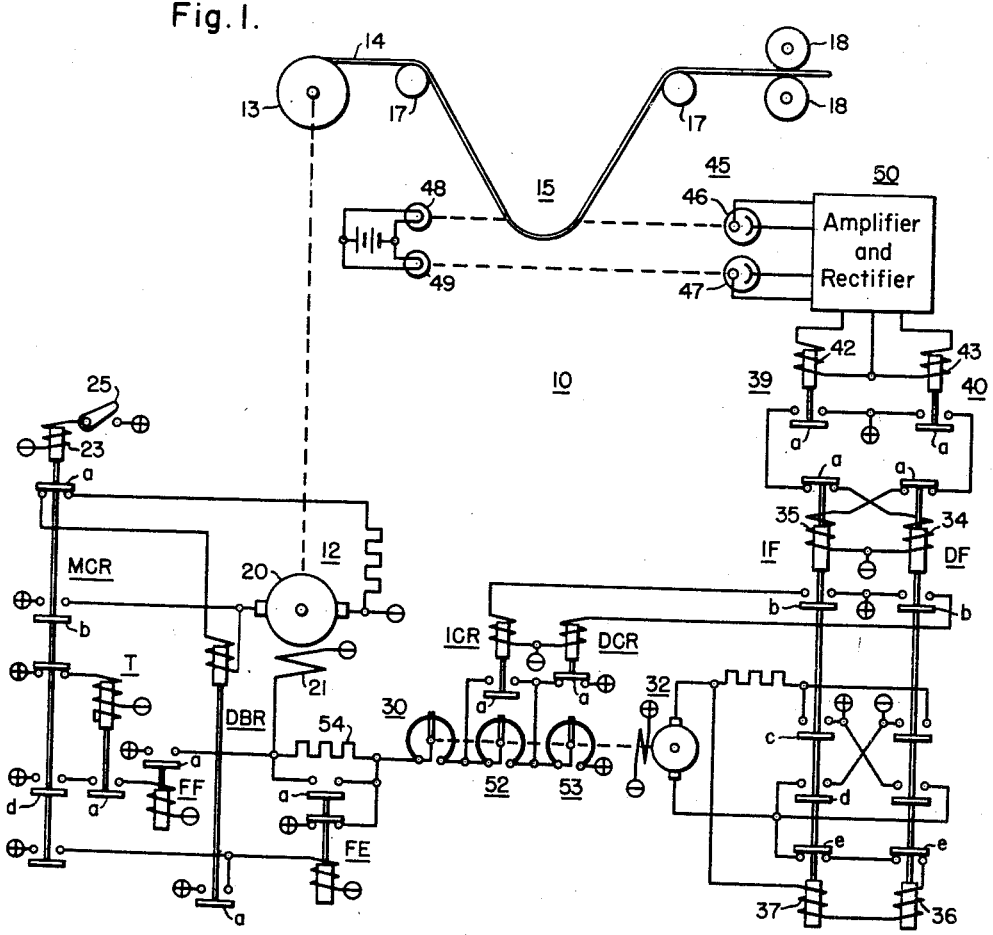

April 3, 1951        H. S. FEGELY        2,547,201

LOOP CONTROL SYSTEM

Filed June 30, 1949

WITNESSES:
Robert O. Baird
F. V. Giolma

INVENTOR
Hugh S. Fegely.
BY
G. W. Crawford
ATTORNEY

Patented Apr. 3, 1951

2,547,201

UNITED STATES PATENT OFFICE 2,547,201

LOOP CONTROL SYSTEM

Hugh S. Fegely, Snyder, N. Y., assignor to Westinghouse Electric Corporation, East Pittsburgh, Pa., a corporation of Pennsylvania Application June 30, 1949, Serial No. 102,238

6 Claims. (Cl. 318—480)

My invention relates, generally, to loop control systems, and it has reference in particular to a control system for a motor in a strip handling operation so as to maintain a predetermined amount of loop or slack in a moving strip or length of flexible material which may be, for example, wound on a reel or the like, as it comes from a processing operation.

Generally stated, it is an object of my invention to provide a loop control system of the character described which is simple and inexpensive to manufacture, and which is reliable and effective in operation.

More specifically, it is an object of my invention to provide, in a loop control system for a reel or other strip handling motor, for progressively changing the field excitation of the motor to maintain a substantially constant amount of loop in the strip of material, and for anticipating each change in the field excitation.

Another object of my invention is to provide, in a loop control system, for making anticipatory changes in the field excitation of the reel or other strip handling motor in accordance with the speed of the motor.

Yet another object of my invention is to provide, in a loop control system, for utilizing control means responsive to a change in the amount of loop in a strip of material to both effect operation of a field rheostat controlling the field excitation of a motor connected in driving relation with the strip, and for providing a predetermined anticipatory change in the field excitation of the motor which is proportional to the speed thereof.

It is an important object of my invention to provide, in a control system for a reel motor, for selectively controlling a motor-operated rheostat to change the field excitation of the reel motor, and for selectively controlling the connection of auxiliary resistance means in the field circuit of the motor to provide an anticipatory change of field excitation thereof in a predetermined ratio with the existing field excitation.

Other objects will in part be obvious, and will in part be explained hereinafter.

In practicing my invention in one of its forms, a pair of photosensitive devices and associated light sources are utilized in spaced relation so as to be selectively disposed in interfering relation with a loop in a strip or length of material to control the operation of a motor connected in driving relation with a reel or other device arranged to wind or otherwise handle the strip of material. Relay means selectively responsive to interference of the strip with the passage of light between the sources and the photosensitive devices control the operation of a reversible rheostat motor connected in driving relation with a main field rheostat for the motor, so as to vary its field excitation in the proper direction to maintain a predetermined amount of loop as the diameter of the coil of strip on the reel device increases. Auxiliary rheostats are utilized in connection with the main rheostat to maintain substantially constant ratios of resistance relative to the main rheostat in any operating position of the main rheostat. These auxiliary rheostats are selectively made effective or ineffective by the relay means, so as to provide anticipatory changes of field excitation in the direction in which the rheostat motor is being operated, thus preventing overshooting of the motor-operated rheostat.

Figure 2:
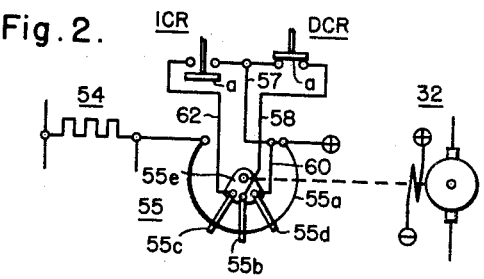

For a more detailed understanding of the nature and scope of my invention, reference may be made to the following detailed description, which may be read in connection with the accompanying drawing, in which:

Figure 1 is a diagrammatic view of a loop control system as applied to a reel motor and embodying the invention in one of its forms; and Fig. 2 is a diagrammatic view of an alternate arrangement of field excitation circuit disposed to be substituted in the system of Fig. 1.

Referring to Figure 1 of the drawing, the reference numeral 10 may denote, generally, a loop control system disposed to be used with a reel motor 12 which may be connected in driving relation with a reel 13 for winding a strip of material 14. The strip of material 14 may be provided with a loop 15 therein between a pair of guide rolls 17 and an adjacent pair of pinch rolls 18 through which the strip may pass on its way to the reel 13 from a processing operation, such as a pickling operation or the like. The pinch rolls 19 may be operated in any suitable manner, the driving means therefor being omitted from the drawing since it does not form a part of the present invention.

The motor 12 may comprise an armature 20 and a field winding 21. The armature 20 may be connected to a suitable source of electrical energy by means of a master control relay MCR having an operating winding 23, the energization of which may be controlled by suitable control means represented by the knife switch 25.

In order to provide for controlling the energization of the field winding 21, a main or principal field rheostat 30 may be connected in circuit relation with the field winding and a suitable source of electrical energy. Operation of the main field rheostat 30 may be effected by means of a rheostat motor 32, which may be reversibly operated by means of control relays DF and IF, to decrease and increase the excitation of the field winding 21, respectively.

The relays DF and IF may be provided with operating winding 34 and 35 and "hold" windings 36 and 37, respectively. The operating windings 34 and 35 may be selectively energized by means of auxiliary control relays 39 and 40, having operating windings 42 and 43 which are disposed to be selectively energized from a light-sensitive control system 45.

The light-sensitive control system 45 may comprise upper and lower photo or light-sensitive devices 46 and 47 associated with light sources 48 and 49, respectively. The light-sensitive devices 46 and 47 may be so arranged that the loop 15 of material between the guide rolls 17 normally interferes with the path of the light from the source 48 to the upper light-sensitive device 46, but remains above the path between the source 49 and the light-sensitive device 47.

A suitable amplifier and rectifier system 50 may be utilized in connection with the light-sensitive devices 46 and 47 for so controlling the energization of the control relays 39 and 40 that the control relay 40 will operate to its energized position when light from the source 48 impinges on the light-sensitive device 46, whereas the control relay 39 will remain in the deenergized position so long as the light-sensitive device 47 is illuminated from the source 49. The "hold" windings 36 and 37 may be connected across the armature circuit of the rheostat motor 32 through normally closed contact members (c) of relays IF and DF, so as to provide for maintaining the relays IF and DF in the deenergized position whenever the rheostat motor is being brought to a stop.

In order to provide for anticipating changes in the field excitation of the reel motor 12, and for preventing overshooting and hunting in the operation of the rheostat motor 32, auxiliary rheostats 52 and 53 may be utilized. These rheostats may be connected in circuit relation with the reel motor field winding 21, and may be connected in operating relation with the motor 32 operating the main field rheostat 30, so that the effective resistance thereof is maintained at all times in a predetermined ratio with the effective resistance of the main field rheostat 30.

The auxiliary field rheostats 52 and 53 may be provided with control relays ICR and DCR, associated with the relays IF and DF, respectively, for selectively controlling the effectiveness of the auxiliary rheostats in the field circuit of the reel motor. The control relay ICR may be connected in shunt circuit relation with the auxiliary field rheostat 52, and disposed to provide a shunt circuit about the rheostat 52 through its contact member (a) whenever the control relay IF operates, so as to render the field rheostat 52 ineffective and thereby increase the field excitation. The control relay DCR may be disposed to normally provide a shunt circuit about the auxiliary field rheostat 53 through its contact member (a) and operates in response to the operation of the control relay DF to remove the shunt and render the auxiliary field rheostat 53 effective to reduce the excitation of the field winding 21.

In order to insure full field when starting the reel motor, a field relay FF may be provided for connecting the field winding 21 directly to the source of energization, instead of through the field rheostats 30, 52 and 53. A time delay relay T may be provided in connection with the master control relay MCR, for retaining the field relay FF operated for a predetermined time after starting.

A field economizing relay FE may be provided for maintaining a reduced field on the reel motor through a resistor 54 when the motor is not in normal operation. A dynamic braking relay DBR connected across the armature 20 provides an energizing circuit for the relay FE so long as the armature voltage remains above a predetermined value, thus insuring full field during dynamic braking.

In operation, the master control relay MCR may be operated by closing the control switch 25 to provide an obvious energizing circuit for the armature 20 of the reel motor through contact member (b) of relay MCR. Relay FE will thereupon be energized to shunt resistor 54. With the loop 15 in the position shown, the path between the source 48 and the upper light-sensitive device 46 will be blocked, so that the control relay 40 will remain in the deenergized position. Since the lower light-sensitive device 47 is illuminated from the source 49, the control relay 39 will also be in the deenergized position. The control relays DF and IF will both remain in the deenergized position, so that the rheostat motor 32 will be inoperative. Since the time delay relay T remains in the energized position for a predetermined time, an obvious energizing circuit is provided for the field relay FF through contact members (d) and (a) of relays MCR and T, respectively. The field winding 21 of the reel motor will, under these conditions, be energized by a circuit extending through contact member (a) of relay FF. After a predetermined interval of time, relay T returns to the deenergized position, deenergizing relay FF. The field winding 21 will thereupon be energized over a circuit extending through contact member (a) of relay FE, the main rheostat 30, the auxiliary rheostat 52, and contact member (a) of control relay DCR.

Since the diameter of the coil on the winding reel 13 increases progressively, the loop 15 has a tendency to pull up or decrease. Should the upper photosensitive device 46 become illuminated from the source 48, the control relay 40 will operate and establish an obvious energizing circuit for the control relay IF through contact members (a) of relays 40 and DF.

Operation of relay IF establishes an obvious energizing circuit for the control relay ICR through contact member (b) of relay IF. Relay ICR operates and shunts the auxiliary rheostat 52, thus immediately increasing the excitation of the reel motor field winding 21, so as to slow down the reel motor 12 and tend to restore the loop 15 to its original value.

Operation of the relay IF also connects the armature of the rheostat motor 32 to a source of electrical energy through an obvious energizing circuit including contact members (c) and (d) of relay IF, so as to provide for operating the rheostat motor in a direction to decrease the effective resistance of the main field rheostat 30 to increase the excitation of the field winding 21.

Since the operation of the control relay ICR increased the excitation of the field winding 21 substantially instantaneously, restoration of the loop 15 to its original value will be accelerated, so that the path of the light between the source 48 and the upper photosensitive device 46 will be again interrupted. The control relay 40 thereupon returns to the deenergized position, interrupting the energizing circuit of the operating winding 35 of the relay IF.

Relay IF returns to the deenergized position, in which it is held by reason of energization of the "hold" operating winding 37, which is now connected across the armature of the rheostat motor 32 through contact members (e) of the relays IF and DF. Deenergization of relay IF interrupts the energizing circuit for the control relay ICR, and again renders the auxiliary field rheostat 52 effective in the circuit of field winding 21, so that the excitation thereof is now changed only by the changed effective values of rheostats 30 and 52 as effected by operation of the rheostat motor 32.

Since, in normal operation, the diameter of the coil on the reel 14 continues to increase, the rheostat motor 32 will be progressively operated to actuate the main field rheostat 30 in a direction to progressively increase the field excitation of the reel motor field winding 21, and slow down the reel motor 12 so as to maintain the loop 15 in a position between the upper and the lower light-sensitive devices 46 and 47.

Should the loop 15 for some reason increase, so as to block the path of the light between the source 49 and the light-sensitive device 47, the control relay 39 will operate. This provides an obvious energizing circuit through contact member (a) of relay 39 for the relay DF which connects the rheostat motor 32 so as to actuate the main field rheostat 30 in a direction to increase the effective amount of resistance in the field circuit of the reel motor and speed up the motor. At the same time an obvious energizing circuit is provided through contact member (b) of relay DF for the control relay DCR. This control relay operates to the energized position, and immediately connects the auxiliary rheostat 53 in circuit relation with the field winding 21. This effects an anticipatory change in the field excitation of the reel motor in the same direction as is being effected by operation of the rheostat motor 32, speeds up the reel motors, and rapidly restores the loop 15 to the desired position, thus preventing any overshoot in the operation of the rheostat motor 32, since the control relay 39 will be quickly returned to the deenergized position so as to effect deenergization of relay DF, whereby operation of the rheostat motor 32 is terminated.

The reel motor 12 may be stopped by opening switch 25 to deenergize the master control relay MCR. The dynamic braking relay DBR will thereupon be energized over the circuit completed through contact member (a) of relay MCR. An obvious energizing circuit is provided for the field relay FE through contact member (a) of relay DBR. Relay FE operates to shunt out resistor 54 until the armature voltage of the reel motor drops to a predetermined value, whereupon relay DBR returns to the deenergized position, interrupting the energizing circuit for relay FE.

Instead of utilizing a main field rheostat 30 and auxiliary field rheostats 52 and 53 as shown in Fig. 1, for effecting anticipatory changes of field excitation, a main rheostat 55 may be utilized as shown in Fig. 2. The rheostat 55 may comprise a resistance element 55a which may be tapered in value in any manner well known in the art and having, for example, resistance steps of relatively low value at the left-hand end, and resistance steps of relatively high value at the right-hand end.

By utilizing a main movable arm 55b, which may be of the usual type, in conjunction with auxiliary arms 55c and 55d, only a single rheostat is necessary to obtain anticipatory control in accordance with the teachings of my invention. The auxiliary arms 55c and 55d may, for example, be positioned on each side of the main arm 55b, being connected thereto in predetermined fixed relation by insulating means 55e. For example, the arms 55c and 55d might be positioned about fifteen degrees on opposite sides of the arm 55b.

The rheostat 55 may be operatively connected to the rheostat motor 32 which is controlled and operates in exactly the same manner as described in connection with Fig. 1. The rheostat 55 may be connected in circuit relation with the field winding 21 between the resistor 54 and the positive terminal of the source, being substituted for the rheostats 30, 52 and 53.

Control relays ICR and DCR may be utilized to shunt out the section of the rheostat between the arms 55c and 55b, and remove a shunt connection from the section of the rheostat between arms 55b and 55d, in a manner similar to that described in connection with the system of Fig. 1.

Since the steps of resistance of the rheostat 55 are tapered, the amount of change effected by the relays ICR and DCR will always be proportional to the setting of the rheostat, and hence proportional to the speed of the reel motor. Normally the circuit through the rheostat 55 will be from positive through conductor 57, contact member (a) of relay DCR and conductor 58 to arm 55b, and hence through the rheostat to resistor 54, and the field winding 21 to negative as in Fig. 1. Whenever the rheostat motor 32 operates to increase the resistance in the field circuit, the relay DCR will operate and remove the shunt from the section of resistance between arms 55b and 55d, so that the current path must now be from positive through conductor 60 and arm 55d, thus anticipating operation of and effecting a rapid stop of the motor 32 through return of the loop to the normal position and the consequent restoration of the light sensitive control system to normal. When it operates in the other direction, the relay ICR shunts out the section of the rheostat between arms 55b and 55c, and provides a path from positive through conductor 57, contact member (a) of relay ICR, and conductor 62 to arm 55c. Operation of the reel motor 12 is effected in the same manner as described in connection with the system of Fig. 1.

From the above description and the accompanying drawing, it will be apparent that I have provided, in a simple and effective manner, for controlling the amount of loop in a strip handling system. For example, operation of a reel motor may be effected by anticipating the changes in field excitation necessary to maintain a predetermined amount of loop in a strip of material being wound on a reel. While the invention has been described in connection with a reel motor, it will be apparent that it is not limited to such an application, and may also be used where the loop is to be maintained between adjacent pairs of pinch rolls, or the like. By utilizing auxiliary rheostats which may be connected in operating relation with the motor-operated main field rheostat of the reel motor, the amount of the anticipatory change may be maintained in a predetermined ratio with the speed of the reel motor so as to provide a more effective stabilizing and antihunt control system. By utilizing auxiliary field rheostats having a predetermined ratio of resistance relative to the main field rheostat, for example, on the order of 5% thereof, operation of the reel motor control system may be effected so as to reduce hunting of the loop to a negligible value.

Since certain changes may be made in the above-described construction, and different embodiments of the invention may be made without departing from the spirit and scope thereof, it is intended that all the matter contained in the above description and shown in the accompanying drawing shall be considered as illustrative and not in a limiting sense.

I claim as my invention:

1. A control system for a motor disposed in driving relation with a reel for winding a strip of material having a loop therein, comprising, a pair of vertically spaced photo-sensitive devices and light sources disposed in selective interfering relation with the loop, a principal motor operated rheostat connected to vary the field excitation of the motor in opposite senses, switch means selectively responsive to interference of the loop with the light beams between the photo-sensitive devices and their light sources to effect operation of the rheostat motor in opposite senses, an auxiliary rheostat connected in driving relation with the rheostat motor, said rheostat being disposed for connection in circuit relation with the principal rheostat and disposed to maintain a predetermined ratio relationship with the principal rheostat, and circuit means including contact means of said switch means disposed to control the connection of said auxiliary rheostat in circuit relation with the principal rheostat.

2. In a control system for a motor, circuit means including a motor-operated principal field rheostat disposed to supply variable field excitation to the motor, an auxiliary rheostat operatively connected to the motor-operated rheostat to maintain a predetermined resistance ratio with the principal rheostat, switch means operable to effect operation of the rheostat motor, and circuit means including contact means of the switch means disposed to connect the auxiliary rheostat to vary the field excitation in the same sense as the motor-operated rheostat.

3. The combination with a motor having a field winding, of a principal rheostat connected in circuit relation with the field winding to vary the excitation thereof, an auxiliary rheostat connected in circuit relation with the principal rheostat having on the order of five per cent of the resistance of the principal rheostat connected in operating relation with the principal rheostat to maintain substantially a five per cent effective ratio of the resistance for any operating position, and switch means operable to effect operation of the rheostat motor to decrease the effective value of the resistance of the principal rheostat and render the auxiliary rheostat ineffective.

4. In a control system for a motor having a field winding, a principal rheostat connected in circuit relation with said field winding, said principal rheostat having a reversible motor connected in driving relation therewith, a pair of auxiliary rheostats connected in circuit relation with said principal rheostat, control means selectively responsive to operate the reversible motor in directions to decrease and increase the resistance in circuit with the field winding, and circuit means including normally open contact means and normally closed contact means of the control means connected in shunt circuit relation with the auxiliary rheostats.

5. In a control system for a motor connected in driving relation with a reel, a main rheostat connected to vary the field excitation of the motor, a reversible rheostat motor connected in driving relation with the main rheostat, a pair of auxiliary rheostats connected in circuit relation with the main rheostat, said auxiliary rheostats being connected in driving relation with the main rheostat and disposed to maintain predetermined ratios of resistance relative to the main rheostat, switch means selectively operable to effect operation of the rheostat motor to increase the amount of field excitation or reduce it, and circuit means including contact members of the switch means disposed to shunt and thereby render one auxiliary rheostat ineffective or render the other auxiliary rheostat effective.

6. In a loop control system for a reel motor disposed to wind a strip of material having a loop therein disposed in selective interfering relation with a pair of photo-sensitive control devices, a motor-operated principal field rheostat disposed to vary the field excitation of the motor, a pair of auxiliary rheostats connected in operating relation with the principal rheostat, said auxiliary rheostats being connected in circuit relation with the principal rheostat and having a predetermined ratio of resistance with the principal rheostat, switch means operable to provide an operating circuit for the rheostat motor to increase the field excitation of the reel motor and shunt one of said auxiliary rheostats, additional switch means operable to provide an operating circuit for the rheostat motor to decrease the field excitation of the reel motor, and circuit means connecting the photo-sensitive control devices to effect selective operation of the switch means and the additional switch means.

HUGH S. FEGELY.

REFERENCES CITED

The following references are of record in the file of this patent:

UNITED STATES PATENTS

| Number | Name | Date |
|---|---|---|
| 1,608,761 | Ashbaugh | Nov. 30, 1926 |
| 2,432,876 | Formhals et al. | Dec. 16, 1947 |